Dec. 28, 1926.

P. E. TODD 1,612,163

SPRING TOGGLE SUPPORT

Filed Oct. 27, 1924     4 Sheets-Sheet 1

INVENTOR
Paul E. Todd.
BY
William M. Swan.
ATTORNEY

INVENTOR
Paul E. Todd.
BY
William M. Swan.
ATTORNEY

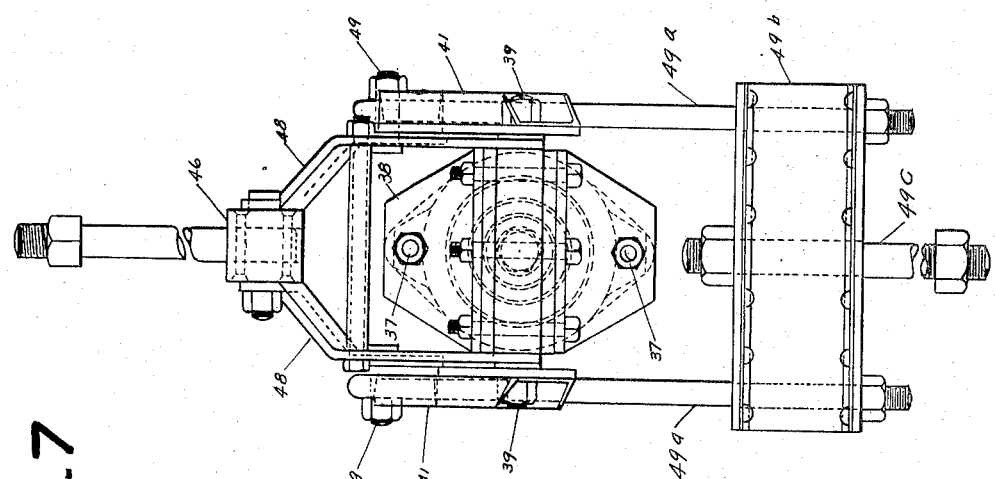
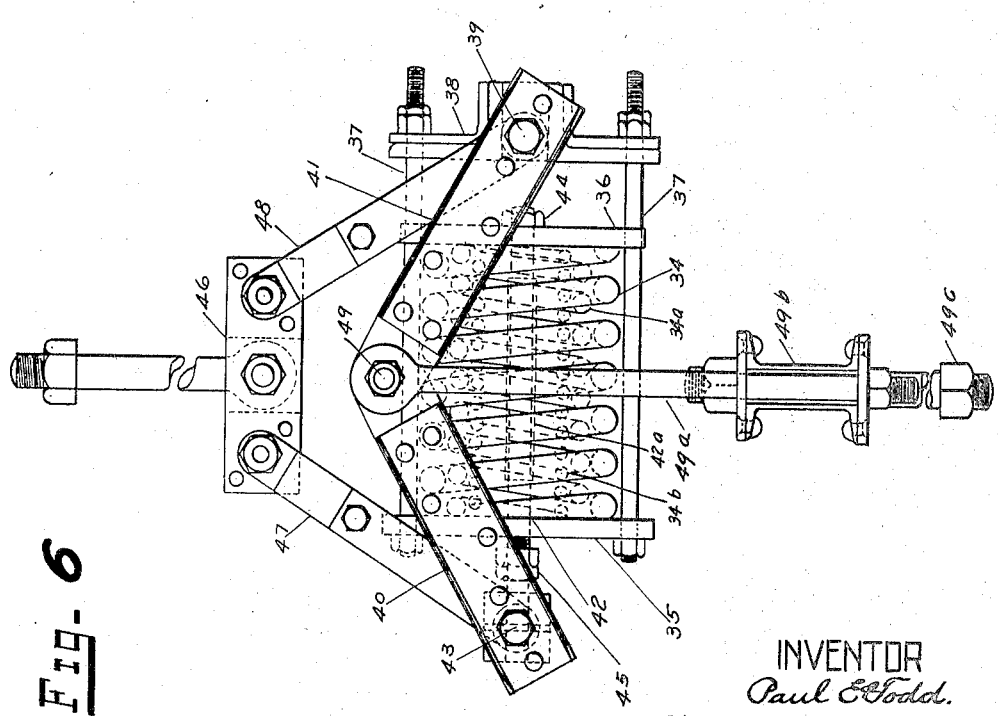

Dec. 28, 1926.
P. E. TODD
1,612,163
SPRING TOGGLE SUPPORT
Filed Oct. 27, 1924
4 Sheets-Sheet 4
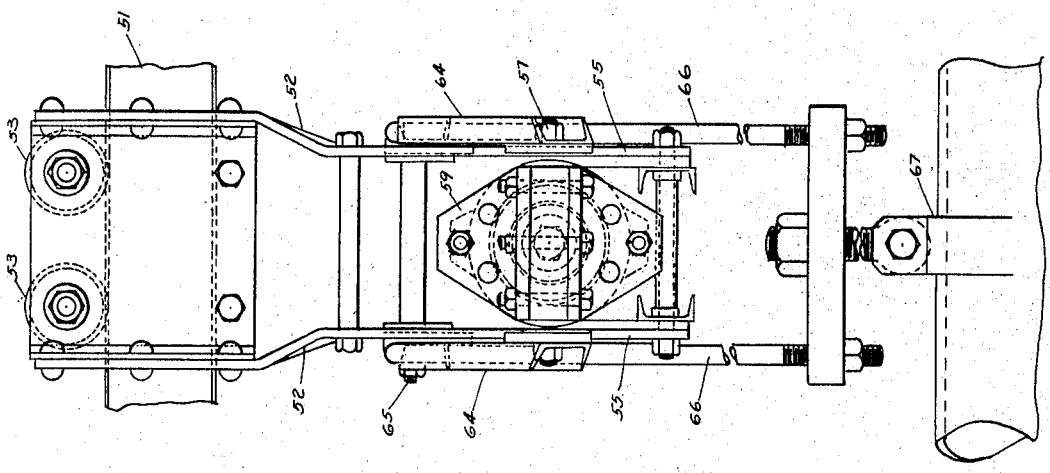
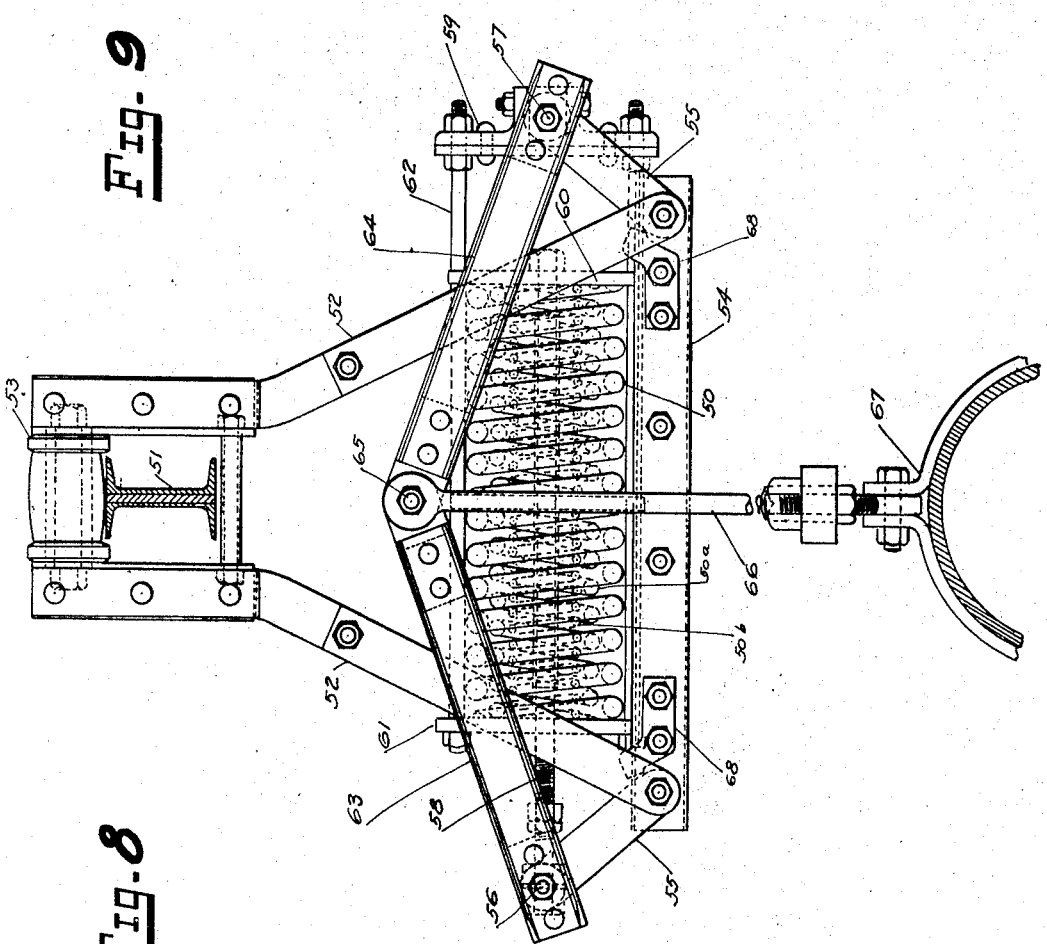
INVENTOR
Paul E. Todd.
BY
William M. Swan.
ATTORNEY Patented Dec. 28, 1926.

1,612,163

UNITED STATES PATENT OFFICE.

PAUL E. TODD, OF DETROIT, MICHIGAN.

SPRING TOGGLE SUPPORT.

Application filed October 27, 1924. Serial No. 746,020.

This invention relates to a spring toggle support for permitting a supported article or object to move through a more or less definitely predetermined range of possible travel, while interposing a minimum of resistance thereto and maintaining a practically unchanging supporting stress, thus reducing the liability of transmitting injurious structural strains thereto, or to the structural elements of the building wherein it is located. It is of special utility in effecting the adequate support of high pressure superheated steam pipes, which experience has shown tend to develop high and varying stresses and relative positions due to high temperatures and variations in temperature. In the accompanying drawings I have shown the various forms of my improved device as applied thereto; but it is of course obvious that with little or no change the ideas herein disclosed could be rendered equally useful in other fields of use as well, and I desire my disclosure and claims to be understood accordingly.

In the drawings:

Figure 6 is an elevational view, taken from the same relative position as Figures 1 and 4, showing a modified form of my improved construction, wherein a cage or confining frame is used to effect the inward compression of a single horizontally disposed spring, in place of centrally applied pressure outwardly upon two cooperating springs.

Figure 7 is an elevational view taken at right angles from the position from which Figure 6 was taken.

Figure 8 is an elevational view of a further modified form of my improved constuction, in which a combination of the cage construction shown in Figure 6 and compounded levers are relied upon to secure the combined toggle effect and spring resistance thereto.

Figure 9 is an elevational view of the device of Figure 8, taken from a position at right angles thereto.

In the case of large steam pipes in power and central heating plants, experience has shown that under varying conditions of heat and steam pressure a point carefully selected and marked with reference to fixed objects near it will sometimes vary in location as much as seven inches, due to the buckling and expansion of the pipe when subjected to the temperature of superheated steam. In some cases these pipes are preferably suspended from ceiling beams or other structural elements, and in other cases supported from beneath, but in either instance it is not only advisable but necessary to afford these members sufficiently firm support to constitute a workmanlike installation, and at the same time to adequately provide for the distorting strains just remarked upon, without resultant impairment of either the pipe or the support.

Figure 1:
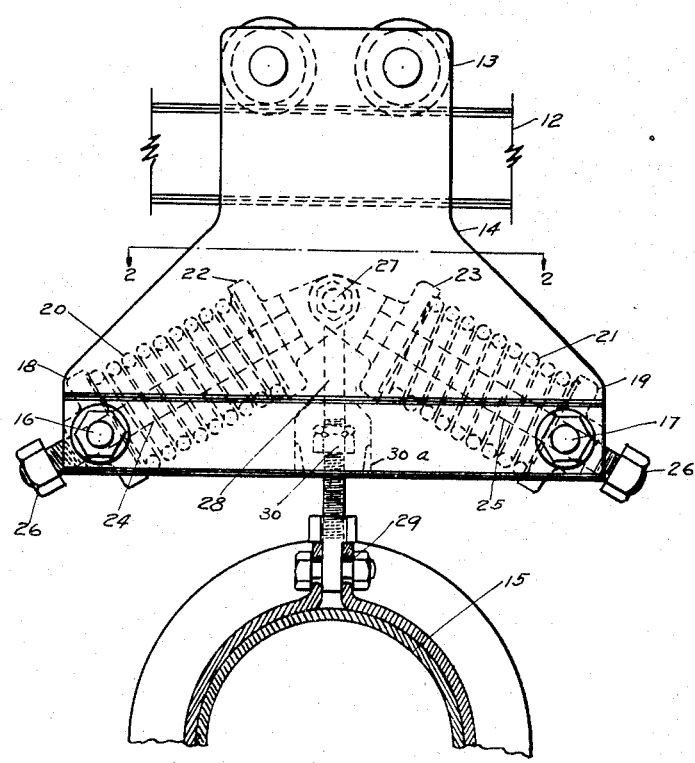
Figure 1 is an elevational view, partly in dotted-in phantom, showing one form of my improved construction in position for supporting a steam or similar pipe from a beam or similar structural element.

In the accompanying drawings I have illustrated various forms of apparatus designed to cope with these conditions, or with similarly resultant conditions as to other or analogous constructions, 12 representing in Figure 1 a ceiling beam, from which is supported, if desired on rollers 13, a sling or supporting frame piece 14, which, in a position parallel with the beam 12 and crosswise of the steam pipe 15 shown in Figure 1, is considerably broader at its base than at its top, beam-engaging portion. Pivotally supported, as at 16 and 17 respectively, adjacent either end of the sling 14 are a pair of cage or abutment members 18 and 19 respectively, against which are adapted to rest the lower ends of the compression springs 20 and 21, against the upper ends of which rest the companion cage members 22 and 23, from each of which stems 24 and 25 extend lengthwise of their springs 20 and 21 to a point beyond the lower end of its cage piece 14. The screw-threaded lower end of each stem carries on its end an adjusting nut 26, which engages against the lower face of its cage piece 18 (or 19) in such a way that the desired normal or initial compression upon each spring 20 or 21 can be regulated as desired. The two top cage pieces 22 and 23 are joined by the pivot pin 27 which passes through an eye at the top end of the link piece 28, which extends to adjustable connection with the pipe-supporting loop 29; adjustability of the former as regards height of the pipe is secured through the medium of the swivel nut 30.

If for any reason the initial weighting lengthwise of the link 28 exceeds what was intended as regards the normal load upon the toggle support, provision is made for preventing an undesired sagging, by arranging that the nut 30 shall engage downwardly against a projecting shoulder or point $30^a$ in the bottom of the sling structure 14.

Figure 3:
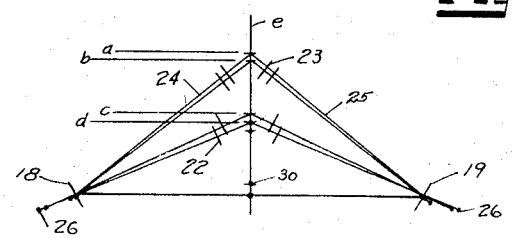
Figure 3 is a diagrammatic view designed to bring out the possible position variations of the clevis head as regulated in the initial installation of the apparatus.

Of course the lateral buckling movement of the pipe 15 is made possible without substantial effect upon its supporting elements, through the fact that the entire sling element 14 may move lengthwise of the beam 12 on its rollers 13, thus permitting a lateral expansive sway of the pipes, with only a slight variation of the pull exerted upon one or the other of the springs 20 and 21. In case, however, the expansive effect of the pipe is downward or upward, this tends to pull downwardly or thrust upwardly upon the link 28, and consequently to transmit through the medium of each of the upper cage pieces 22 and 23 an actuating force upon the springs 20 and 21. As brought out in diagrammatic Figure 3, the nuts 26 and 30 are, in the process of assembling or installation of the apparatus, so positioned on their stems 24 and 25 and 28 respectively that allowance is made for vertical movement of the link 28 between the points $b$ and $c$, the former of which may be taken to represent the position of the parts with the normal cold (or hot) condition of the pipe prevailing, and the latter of which may similarly be looked upon as representing the normal hot (or cold) condition thereof. The points $a$ and $d$ represent what may be designated as the allowance positions or extra margin of movability allowed for by the positioning of the nuts 26 against the abutments of the springs and of the nut 30 on the link 28. The purpose of the device being to maintain a substantially unchanged pull (or lift) whatever be the expanded relative position of the pipe as regards its support, the result of the angular position of the stems 24 and 25 and the resultant degree of compression upon their respective springs 20 and 21, is a practically uniform stress component upon the link 28 and its supported elements at any vertical point along the line $e$ of said diagrammatic Figure 3. Of course, upon a slight diminution of the distorting stress due to the expansion or contraction of the pipe 15, the transmitted compressive pull upon the toggle springs is modified, and each cooperating element rises to a more sharply angular position relatively to the other than was the case when the distorting stress due to the expansive or buckling of the pipe 15 was at its height, the distorting stress referred to above being the actuating force necessary to cause the spring toggle support to move through its range of action. Tests of devices in service show that it responds to very slight variations in the distorting stresses.

Figure 4:
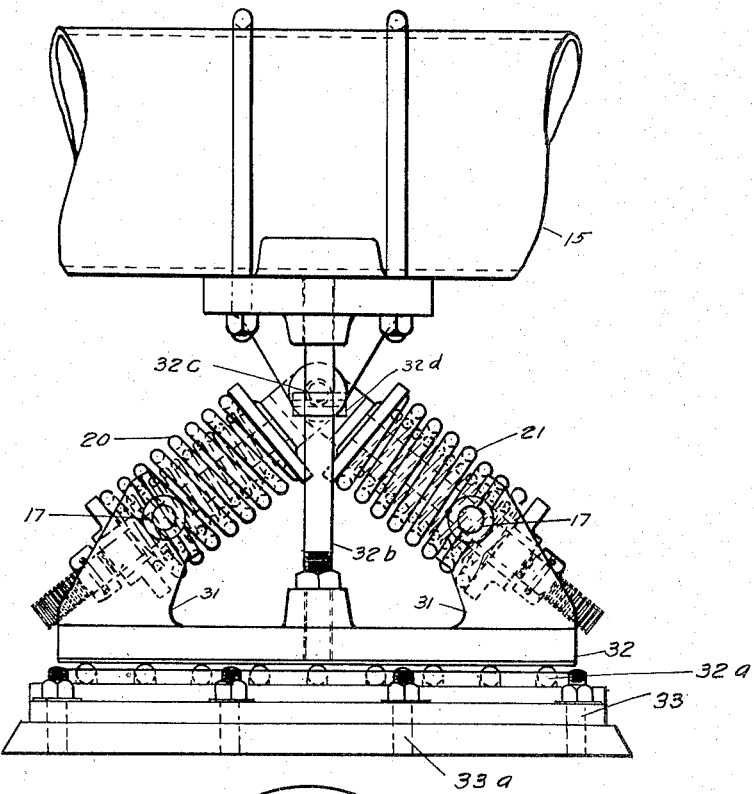
Figure 4 is an elevational view from the same relative position as in Figure 1, showing my improved construction used for supporting a superiorly positioned pipe, instead of a subjacent one.
Figure 5:
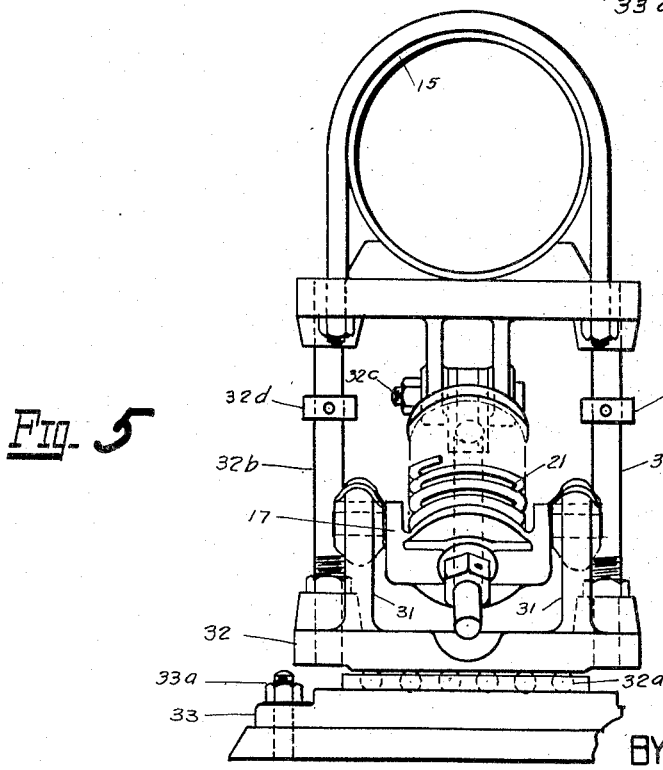
Figure 5 is an end elevational view of the structural combination of Figure 4.

Figure 4, as already noted in the preliminary remarks, represents a positioning of the toggle spring mechanism beneath or subjacent to the pipe 15, as for example, when it is desired to run a pipe only a short distance above the floor level. In this case each of the toggle springs 20 and 21 has its pins 16 and 17 supported from integral struts 31, which rise from the base 32, beneath which is the bed plate 33 suitably anchored to the floor by foundation bolts $33^a$. In this case ball or roller bearings $32^a$ are interposed to care for the lateral and sidewise motion of the pipe or other supported element, similarly to the action of the rollers 13 in the device of Figure 1. The pins $32^b$ serve to transmit any lateral motion in this respect, as well as maintaining a pivotal center at $32^c$ for the toggle spring elements on either side, the stops $32^d$ limiting the downward motion in the same manner as the shoulder $30^a$ in the device of Figure 1.

Figure 2:
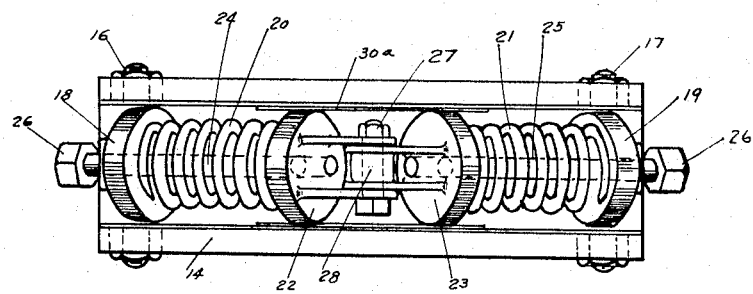
Figure 2 is a plan view of the device of Figure 1, taken along the line 2—2 thereof, and looking in the direction of the arrows there shown.

In Figures 6 and 7 I have shown a modified form of construction, in which there is substituted for the two toggle springs 20 and 21 heretofore involved a single compression spring 34, which is confined between the horizontally movable abutments 35 and 36, the former of which is connected by the flanking bolts 37, the cross-yoke 38 and the pivot stem 39, with the toggle lever 41, whereas the latter is connected with the toggle lever 40 through the medium of the stem 42 and the pivot pin 43. The normal tension of these parts upon the contained springs 34, and, if included, $34^a$ and $34^b$, is regulatable by means of the bolts 44 and 45 respectively. The pipe or sleeve $42^a$ which encircles the stem 42 serves to positively prevent the abutments 35 and 36 from being forced beyond a predetermined point toward one another in excess of what resistance thereto is previously furnished by the spring 34. The cage is hung from the superiorly positioned support 46 by the pivot-connected links 47 and 48, the lower ends of which are traversed by the bolts 43 and 39 respectively. The meeting upper ends of the toggle links 40 and 41 are joined by the pivot pin 49, from which depends the link $49^a$, from which the member to be supported depends, as in the case of the link 28 of the type shown in Figures 1 and 2.

To emphasize the diversity of possible use of this construction, a conventional pair of channel beams 49$^b$ is here illustrated as the means of connection from which a central rod 49$^c$ extends to connection with the element to be supported. In Figures 8 and 9 I have shown a further modified form of construction, wherein a compression spring 50 is used in the same manner as, and has associated with it similar cage and abutment connections to, that shown in Figures 6 and 7, the frame 52 being supported from the beam 51 on the roller 53. In the floor or platform 54 of the sling are pivotally supported at their lower ends a pair of link members 55, which at their upper ends are pivotally connected at 56 and 57 respectively with the end of the drawing link 58, and with the yoke 59; said yoke acting to draw upon its end abutment 61 through the medium of the flanking rods 62, whereas the single or central link 58 exerts its pull upon the righthand end of the spring through the medium of the abutment piece 60. The two toggle levers 63 and 64 respectively, are connected with the ends of the links 55 and with the uniting bolts 56 and 57 at their lower, outer ends, and are joined at their meeting upper ends by the pivot pin 65, from which depends the link 66, from which the pipe-supporting loop 67, or similar object to be supported, depends. Thus through the compounding of these levers and the interpositioning of the springs 50 the same resilient opposition to the downward movement of the toggle elements 63 and 64 is secured as in the form of construction illustrated in Figures 1 and 2, wherein a spring encircles each toggle arm.

It is obvious from the above description that any type of spring may be used in the spring toggle support with but very little modification of the idea as disclosed above. Among the types of spring applicable are compression and union springs, helical or conical, torsional and elliptical or semi-elliptical.

What I claim is:

1. In combination with an object to be supported, a pair of toggle arm members operatively connected therewith and with one another, a frame member bridging the angle enclosed between said toggle arms and connected with their outer ends, thereby forming with them a permanently triangular structure of variable angularity according to the strain transmitted to them from the object to be supported, and spring members of superior compressive resistance to the maximum strain expected from such object, whereby the swing of said arms to positions of complete coaxiality and the resultant termination of their angular relation to one another and to said frame member is prevented.

2. In a spring toggle support for a variantly positionable external element, in combination with a supporting frame, a pair of toggle arms pivotally connected therewith at their lower ends and having their obliquely overengaging upper ends pivotally joined and operatively connected with the object whose variant support is desired, said frame and said arms thus constituting a permanently triangular structure of variable angularity, and spring elements operatively connected with said toggle arms and capable of resiliently resisting a draw upon their point of pivotal union tending to swing said arms toward positions of coaxiality, the resisting strength of the springs to such draw being well in excess of the expected maximum strain from the object to be supported.

3. In a spring toggle mechanism, in combination with a plurality of toggle members correlated in positions of permanent though variable angularity, a connection leading from the apex thereof to an object whose variant support is desired, spring means adapted to yieldingly resist the swing of said toggle members, induced by increase in the imposed load, to positions of changed angularity in their relative positions, a frame member extending substantially perpendicularly to the line of such imposed strain, being pivotally connected at its ends with the lower ends of said toggle members, and means for positively halting the further swing of said toggle members in case the degree of imposed strain exceeds a predetermined yield on the part of said spring means.

4. A toggle mechanism for affording substantially uniform support to an external element subject to variations in position, comprising a plurality of angularly positioned and terminally pivoted toggle arms, means for operatively connecting their clevis head with the object to be supported, spring elements operatively connected with said toggle arms, whereby their movement toward positions of coaxiality with respect to one another is yieldingly opposed, and abutment elements whereby the swing of said arms past a certain point short of coaxiality is positively halted.

In testimony whereof, I sign this specification.

PAUL E. TODD.